Patented Mar. 26, 1929.

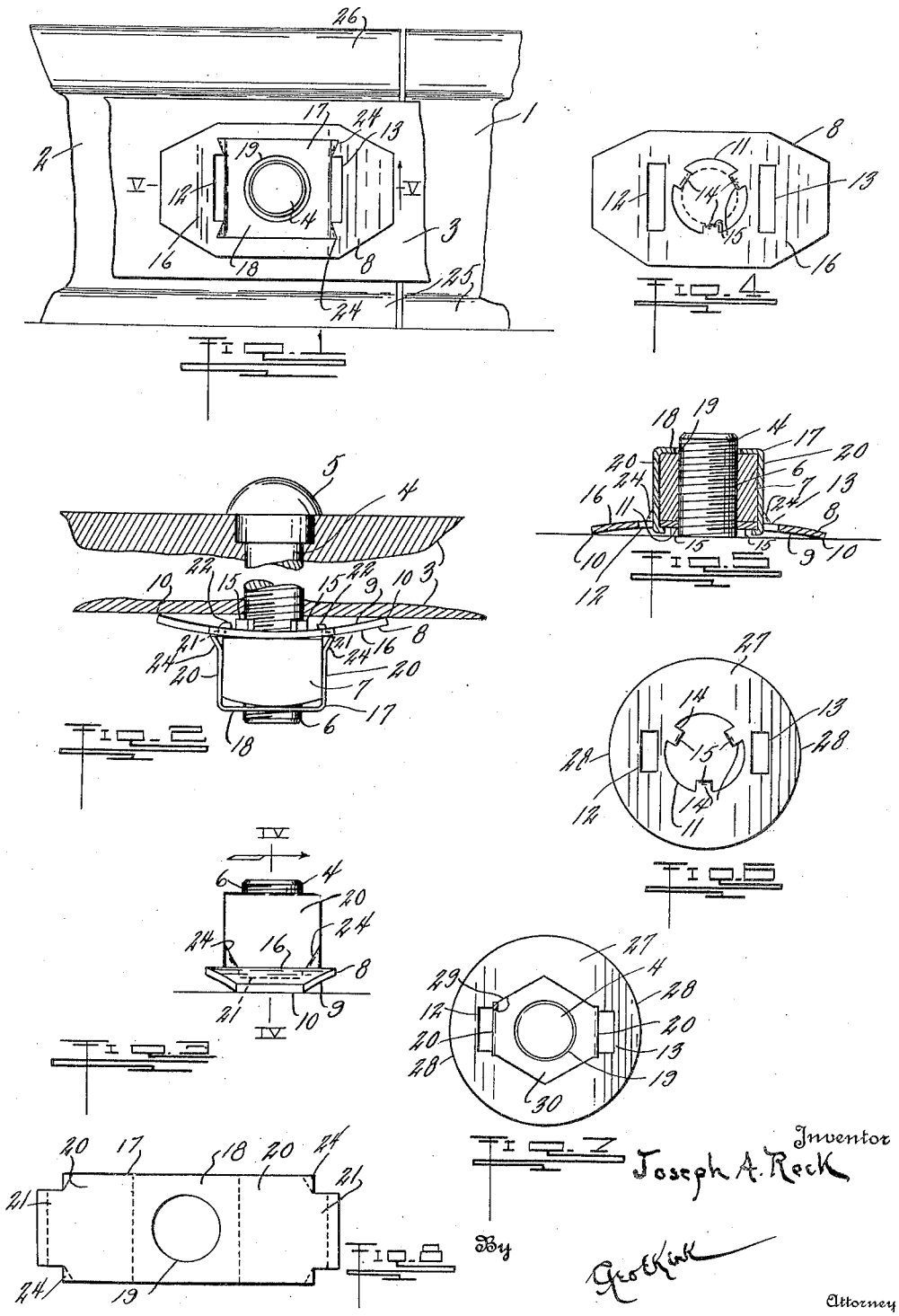

1,706,820

UNITED STATES PATENT OFFICE.

JOSEPH A. RECK, OF ADRIAN, MICHIGAN, ASSIGNOR OF ONE-HALF TO JOHN P. BLAND, OF ADRIAN, MICHIGAN.

NUT-LOCKING DEVICE.

Application filed March 8, 1928. Serial No. 259,952.

This invention relates to features of anchoring and take up between a pair of rotation assembled elements.

This invention has utility when incorporated in a nut and bolt lock with strain or expansion compensation means.

Referring to the drawings:

Fig. 1 is an end elevation of an embodiment of the invention in a rail joint assembly;

Fig. 2 is a plan of the device of Fig. 1;

Fig. 3 is a fragmentary side view of the device of Fig. 1, oriented;

Fig. 4 is a detail view of the take up washer of Fig. 1;

Fig. 5 is a partial section on the line V—V of Fig. 1;

Fig. 6 is a detail view of the take up washer of circular form instead of elongated form as shown in Fig. 4;

Fig. 7 is a view of the washer of Fig. 6 as assembled with a hexagonal nut instead of the square nut as shown in Fig. 1, parts being broken away; and Fig. 8 is a view of the blank for the clip.

T-rails 1, 2, are shown assembled with a joint structure having fish plates 3 with openings through the rails and plates, the plates extending past the joint. Through said registering openings, bolt 4 is placed having on one side head 5 and has protruding from the opposite side threaded portion 6 upon which may be assembled relatively rotatable nut 7.

In accordance with the disclosure herein, before placing the nut 7 on threaded end 6 of the bolt 4, there is placed on such bolt, washer 8 herein shown as dished or concave provided with concave side 9 as a take up. The washer margin or rim on the side 9 of the washer 8 has edges 10. Inwardly from the edges 10 and spaced from central opening 11, the washer is provided with slots 12, 13, shown in diametrically disposed parallel relation.

Additionally, this sheet metal washer 8 is shown as having inwardly extending, at the opening 11, lugs 14 directed in converging relation and having terminally offset portions 15. These offset portions 15 extend away from convex side 16 of the washer, and accordingly into the concave side or region provided between the plane of the sheet metal at the side 9 in the region of the opening 11 and the plane of the edges 10. These offset portions 15 on the inner side are in proximity to the threaded portion 6 of the bolt 4.

In practice, this threaded portion 6 need not be mutilated but may be of normal character and continuous. Likewise, the nut 7 may be of uniform character.

According to the character of the nut selected, the holding means between the nut and washer may be adopted. While a yoke or general type of clip may answer, as shown herein, sheet metal clip 17 is provided having central flat portion 18 with opening 19 clearing any projecting threaded portion 6 of the bolt 4.

In practice, this clip 17 is preferably of spring metal configured to U-shape having, from this flat portion 18, parallel legs 20 for engaging cheeks or sides of the nut 7. These legs 20 extend through respective slots 12, 13, of the washer 8, there to have tongues 21 as extending beyond the sides of the nut 7 through the slots 12, 13. Terminally offset portions 22 of the tongues 21 are effective to snap under the inner sides of the slots 12, 13, and thus hold the clip against upward shifting clear of the bolt 6 and nut 7.

In practice, the nut 7 is run up on the bolt 4 to draw the fish plates and rail web into snug assembly without fully flattening the take up washer or compressible plate 8. This take up washer is desirably made of tempered rustproof chrome vanadium steel thereby having a spring life maintenance not only as against the vibration and hammering action of rolling stock, but as against temperature changes of expansion and contraction. This means that the coaction of the nut with the washer may be uniformly effective against joint loosening. From this it follows there is extended life for the bolt and joint assembly, and, with a given strength of the bolt as to tension and shear, there is increased strength in the joint.

With the nut assembled as to the washer at the desired take up, short of fully flattening the washer, the clip may be thrust upon the nut and hammered or snapped into position.

An additional advantage of this type of construction is that, notwithstanding there is no mutilation of the bolt or nut, there is further utility in that the device may be disconnected readily by insertion of tool or tools into raised ear or cover seat 24 in the leg 20 of the clip or yoke, thus prying the leg outward to have the offsets 22 clear the slots 12, 13, to permit raising of this clip 17 free of the nut 7.

The actual keying as herein effective is due to the sharp edge 10 of the washer cutting into the plate 3. However, as shown in Fig. 1, the extent of this washer 8 is such that it may not rotate between the base flange 25 and the ball 26 of the rail 2.

Washer 27 is shown of circular contour with biting edges 28.

In the event hexagonal nut 29 is used, clip 30 may be adopted.

What is claimed and it is desired to secure by Letters Patent is:

1. A threaded bolt, a spring washer shiftable longitudinally along the threaded portion of the bolt independently of the angular relation therebetween, a nut for the bolt having a flat side, and a clip coacting with the flat side of the nut, said washer having a seat in proximity to the nut but radially clear thereof into which seat the clip may protrude for anchoring the nut, washer and clip as a unit against rotation, said washer extending away from the bolt beyond said clip seat in providing an anchoring edge rendered effective by the nut.

2. A member having a threaded portion protruding to be engaged by a nut having a pair of flat sides, a dished spring washer shiftable longitudinally along the threaded portion of the member independently of the angular relation therebetween, and a snap clip coacting with the flat sides of the nut, said washer having seat means in proximity to the nut but radially clear thereof with which seat means the clip may engage for anchoring the nut, washer and clip as a unit against rotation, said washer extending away from the member beyond said clip seat means in providing an anchoring edge rendered effective by the nut flattening out the washer.

3. A bolt for assembly with a plurality of elements and having a threaded portion clear thereof, a nut for engaging the threaded portion and having a pair of parallel sides, and nut locking means for coacting between the nut, bolt and adjacent element, embodying a spring washer convex away from the element and longitudinally shiftable along the bolt threaded portion toward the element independently of the angular relation of the washer to the bolt, said washer having seat means disposed diametrically of the bolt, and a U-shaped snap clip having central clearance for the bolt with the legs of the U-portion coacting with the nut parallel sides, said legs terminating in engaging portions for entering the seat means of the washer thereby assembling the washer, nut, clip and bolt as a unit with the nut acting against the convex side of the spring washer in thrusting washer portions beyond the seat means from the bolt into biting engagement with the element against relative rotation.

In witness whereof I affix my signature.

JOSEPH A. RECK.